United States Patent Office 3,652,478
Patented Mar. 28, 1972

3,652,478
COATING COMPOSITION FOR ELECTRO-
DEPOSITION COATING
Masao Ishii, Tokyo, and Takashi Sunamori and Sadao Kimura, Ohtake-shi, Japan, assignors to Mitsubishi Rayon Co., Ltd., Tokyo, Japan
No Drawing. Filed Oct. 15, 1968, Ser. No. 767,818
Claims priority, application Japan, Oct. 27, 1967, 42/69,146, 42/69,147
Int. Cl. C08f 15/40
U.S. Cl. 260—29.4 UA   13 Claims

ABSTRACT OF THE DISCLOSURE

Aqueous solution for coating metal surfaces by electrodeposition wherein main element is a copolymer of an acrylate, another ethylenically unsaturated monomer, a dicarboxylic acid and an alkoxyalkylacrylamide. The behavior of the acid resin in water is defined by $pH = pKa + n \log (\alpha/1-\alpha)$. Excellent one-coat surface gloss is achieved when paK, the acidity of the resin, is at least 8.0, $n$, a parameter based on the extension of the resin in water, is in the range 0.5–1.5, and $\alpha$, the neutralization degree, is 30–80%. The resin is self-cross linking, but durability of the film is enhanced when an epoxy or melamine resin is added. A pigment having an acidity pKp werein the absolute value of the difference pKp—pKa is at least 0.1 may be incorporated in the aqueous solution.

This invention relates to a coating composition suitable for use in electrodeposition coating methods. More particularly, the invention pertains to a coating composition for electrodeposition coating which, according to an electrodeposition coating method and by one-coat finish, can form on the surface of a metal a film having excellent surface gloss and various prominent characteristics of a thermosetting resin.

For the purpose of imparting corrosion resistance and beautiful appearance to metal materials, water-type or organic solvent-type coating materials have heretofore been applied to the metal materials by spray-coating, roll-coating, curtain flow coating, dip-coating or the like method. Recently, however, attention has come to be paid to electrodeposition coating methods using water-type coating materials which have such advantages that the resulting films are uniform; even such metal materials as being complex in shape can be easily coated; no danger of fire is encountered in the coating steps; no sanitary problem is brought about; and the reduction in cost is possible due to central controlling of the coating steps. As processes for perparing coating compositions usable in such electrodeposition coating methods, there have been known the processes disclosed in U.S. Pat. No. 3,230,162 and British Pat. Nos. 1,030,425, 1,027,813 and 1,115,130. However, coating compositions obtained according to said processes are marked in cloration of the resulting films and, even in the case of those which do not bring about the coloration of the resulting films, they cannot form films, which have, in combination, an anti-rust property necessary for protective films for metals and a beautiful appearance showing excellent surface gloss. Accordingly, they are chiefly employed as mere coating materials for under coating. Thus, there has not yet been obtained any coating material for electrodeposition coating which can sufficiently display the advantages of electrodeposition coating method and can give a film excellent in efficiencies by only one-time application without requiring any over coat finishing.

Conventional electrodeposition coating materials mostly contain, as the binder resin, highly water-soluble resins composed a large amount of dissociating functional groups for effecting electrophoresis and a large amount of hydrophilic functional group, and hence are favorable in adhesion to materials to be coated. However, they have such drawbacks that bubbles are liable to be trapped in the resulting films; they are high in water-solubility so that the resulting films are low in heat flowability at elevated temperatures to make it impossible to obtain excellent surface gloss; and they contain highly water-soluble resins and therefore the films obtained after baking are great in sensitivity to water and low in anti-rust property. Accordingly, it has been impossible to use them as coating compositions for electrodeposition coating which are usable for one-coat finish.

With an aim to improve the water resistance of the resulting films, British Pat. No. 1,027,813 provides a coating material prepared by forming an acrylamide copolymer and then treating the polymer with paraformaldehyde to convert the amide group into an N-methylolamide group, and British Pat. No. 1,115,130 provides a coating material prepared by butoxymethylating a part of N-methylolamide group of an acrylic coating material containing an N-methylolamide group. These coating materials, however, are still high in water solubility and therefore it is impossible to obtain therefrom, according to electrodeposition coating method and by one-coat finish, films having, in combination, excellent surface gloss and prominent physical and chemical properties.

In the practice of electrodeposition coating, a great present inventors made various studies to find that in order to obtain, according to electrodeposition method and by one-coat finish, a film having, in combination, excellent surface gloss and various prominent characteristics owned by thermosetting coating materials, it is necessary that the amount of hydrophilic functional group in the binder resin component of the coating material be made as small as possible so far as the resin component can be stably dispersed in water to enhance the flow characteristics of the coating material at the elevated temperature, thereby improving the resulting film in surface gloss as well as in anti-rust property.

In the practice of electrodeposition coating, a great factor to make the resulting film always uniform is that the electrodeposition coating bath should not cause any variation due to lapse of time. However, in the case of a conventional coating material using a highly water-soluble resin component as a binder, the dissolved state of the resin component in water varies with lapse of time, and therefore the stability of the electrodeposition coating bath is deteriorated. Further, a polymerization solvent employed in preparing a resin solution differs, in general, from a solvent necessary for dispersing a resin in water, and therefore, in dispersing the resin in water, it is necessary to effect solvent substitution. If the polymerization solvent is left depending on the procedure of said solvent substitution, or when the dissolved state of the resin undergoes variation due to said solvent substitution treatment, the stability of the electrodeposition coating bath is lowered in some cases. Further, in the case of a coating material containing a pigment, the stability of the emulsion is greatly affected not only by the properties of the resin employed but also by those of the pigment employed.

Based on such a detailed knowledge as mentioned above, the present inventors made studies to accomplish the present invention relating to a coating composition for electrodeposition coating which can give by one-coat finish a film having excellent surface gloss and prominent physical and chemical characteristics, in which is used as a main component a copolymer obtained from an N-alkoxyalkyl (meth)acrylamide monomer, itaconic or α-methyleneglutaric acid and other copolymerizable vinyl monomer.

It is therefore a primary object of the present invention to provide a coating composition for electrodeposition coating which is favorable in stability of electrodeposition coating bath and which can form, according to electrodeposition coating method and by one-coat finish, a film having excellent surface gloss and physical and chemical characteristics, which coating composition comprises a coating material containing as a main component a water-soluble or water-dispersible resin, which is a copolymer obtained from an N-alkoxyalkyl(meth)acrylamide monomer, itaconic or α-methyleneglutaric acid, and other copolymerizable vinyl monomer, said copolymer having an acidity represented by pKa of at least 8.0, a polymer chain extension represented by parameter $n$ of from 0.5 to 1.5, a neutralization degree represented by $\alpha$ of from 30–80% (per mole of carboxyl group; the same shall apply hereinafter), a glass transition temperature of 60° C. or below, and a number average molecular weight of 20,000 or less.

A secondary object of the invention is to provide said coating composition for electrodeposition coating which is favorable in bath stability, characterized in that it contains a pigment capable of satisfying the |pKp—pKa| $\geq$ 0.1, wherein pKp represents the acidity of the pigment; and pKa represents the acidity of the resin.

The characteristic of resin which are for the achievement of the primary object of the present invention will be examined below.

As to the behaviors of acids in high polymer in water, it has been known, in general, that in the region where $\alpha$ is not excessively low or high, there is established the following equation:

$$pH = pKa + n \log \frac{\alpha}{1-\alpha} \quad [I]$$

wherein pKa represents the acidity of the resin; $n$ is a parameter showing the extension of polymer chain; represents the neutralization degree of the resin; and pH represents the pH of the aqueous solution or emulsion of the resin deposition coating bath.

The values of pKa and $n$ are indexes representing the hydrophilic property of the resin, and vary depending on the composition of the resin. For example, in the case of a polymer containing a large amount of an acid, which is a dissociating functional group, or of a non-dissociating hydrophilic functional group, the value of pKa decreases and the value of $n$ increases in proportion to the contents of said functional groups. On the other hand, when the content of acid is maintained constant and the content of hydrophilic functional group is lowered, the value of pKa increases and the value of $n$ is maintained substantially constant. Whether a resin is water-soluble or water-dispersible is decided according to the values of pKa, $n$ and $\alpha$, and a resin, which is great in pKa value or which is low in $n$ value and $\alpha$, becomes more water-dispersible.

In order to obtain a film having excellent surface gloss and prominent physical and chemical characteristics, according to electrodeposition coating method and by one-coat finish, the present inventors studied, based on the above-mentioned knowledge, the usable ranges of pKa, $n$ and $\alpha$, to find the facts described below.

That is, when a resin component low in pKa value is used, the resulting electrodeposition coating bath becomes acidic even if the neutralization degree of resin is made high and, depending on the kind of metal, there are some cases where the generation of rust is observed on the metal surface during the electrodeposition coating process. Further, a resin component low in pKa value is high in solubility for water, and high polymer constituting the resin are entangled each other and are electrodeposited in the entangled state on the surface of metal to be coated. Accordingly, the resulting film is low in heat reflowability and has no smooth surface gloss. On the other hand, a resin component having a great pKa value is not dissolved in water even though the neutralization degree of the resin is made high, but is brought into a dispersed state. Since the dispersed particles tend to adhere to one another, the film-forming ability of the resin component during the electrodeposition coating process is lowered and the dispersion stability of the resin in the electrodeposition coating bath is injured. With increasing pKa value, however, the heat reflowability of the resin is improved and the surface gloss of the resulting film is increased. In the present invention, the value of pKa was measured when the bath concentration was 11% by weight and the temperature was 25° C.

An examination of the $n$ value shows the following:

In water, the $n$ value of a water-soluble high polymer tends to vary, in general, from a certain value to 1. Although no ground for said phenomenon has been clarified yet, it is interpreted that the phenomenon is ascribable to the orientation, into the water phase, of the hydrophilic functional groups constituting the resin component, and to the process of dispersion into water of high polymer due to a chemical force. In fact, an aqueous bath containing high polymer of $n \rightleftharpoons 1$ does not cause any variation due to lapse of time. Further, with the variation of $n$ value due to lapse of time, the value of pKa tends to decrease due to lapse of time, as well, whereby the electrodeposition coating bath is lowered in pH and in specific resistance. In case such a resin is used as a coating material for electrodeposition coating, the electrodeposition coating bath formed by use thereof undesirably becomes unstable with lapse of time.

In an electrodeposition coating method in which one-coat finish is effected, it is, of course, necessary that the film obtained after baking should have practical properties. In order to obtain a film having excellent surface gloss, however, it is necessary that the film formed at the time of electrodeposition coating should have heat reflowability. As to the ability of forming an electrodeposited film, the glass transition temperature, represented by Tg, of the high molecular weight substance constituting the resin component becomes an important factor. In case a resin component high in Tg is used, the adhesion of dispersed particles of coating material difficulty takes place, so that the film formed on the surface of a metal to be coated is not increased in electric resistance and is undesirably lowered in throwing power. Further, the heat reflowability of film at the time of curing becomes inferior, and the gloss of the film obtained cannot be said to be favorable.

The molecular weight of resin also is an important factor. In case a resin high in molecular weight is used, there is observed the same phenomenon as in the case where a resin high in Tg is used. Further, not only the value of pKa is lowered but also the value of $n$ is liable to increase. Accordingly, the use of a resin high in molecular weight is not desirable.

The glass transition temperature Tg referred to herein signifies the Tg of a copolymer comprising monomer units other than cross linking functional monomer, and is calculated according to the equation $$1/Tg = W_1/Tg_1 + W_2/Tg_2 \quad [II]$$

wherein $W_1$ and $W_2$ represent, by weight percent, the proportions of individual monomers constituting the polymer component, assuming that the proportion of the polymer comprising other monomers than cross linking functional monomer is 100; and $Tg_1$ and $Tg_2$ represent the glass transition temperatures of homopolymers of individual monomer constituting the polymer.

Further, the molecular weight is a number average molecular weight calculated according to osmotic pressure method. The range of molecular weights suitable for one coat finish is from 5,000 to 20,000 If the molecular weight is less than 5,000, the polymer is undesirably lowered in water dispersibility, and if the molecular weight is more than 20,000, the polymer tends to be lowered in pKa value, and the electrodeposition characteristics thereof are undesirably lowered.

Accordingly, the required conditions for obtaining a film having excellent surface gloss and prominent film properties, according to electrodeposition coating method and by one-coat finish, are such that the high polymer constituting the coating composition employed should have such characteristics as an acidity pKa of at least 8.0, a parameter $n$ of from 0.5 to 1.5, a neutralization degree $\alpha$ of from 30 to 80%, a glass transition temperature $Tg$ of 60° C. or below, and an average molecular weight of 20,000 or less. Particularly when the bath stability is to be sufficiently secured, it is necessary that the electrodeposition coating bath should contain as a main component 2–20% by weight of a resin having pKa of from 8.5 to 9.5; $n$ of from 0.8 to 1.3; $Tg$ of 30° C. or below, preferably from −25° to 10° C.; and an average molecular weight of 15,000 or less, and that, when the bath contains 11% by weight of solids, the specific electroconductivity of the bath should be controlled to 150–800 $\mu$ ℧/cm. (measured at 25° C.).

An electrodeposition coating material composed of a water-soluble or water dispersible resin capable of satisfying the abovementioned conditions has an excellent one-coat finish property. For the purpose of obtaining a resin component, which satisfies such conditions, monomers constituting said resin will be examined below.

Generally, monomers having cross linking functional groups which display thermosetting properties are mostly high in polarity and great in degree of hydrophilic property. In order to obtain an electrodeposited film having desired solvent resistance, stain resistance and anti-rust property, the cross linking density of the film should be made high. For the achievement of the above purpose, therefore, cross linking functional monomers should be used in considerably large amounts. However, polymers obtained by using large amounts of said hydrophilic vinyl monomers are low in pKa value and high in $n$ value, and hence are not desirable. In order to improve the above points, it is necessary that relatively vinyl monomers containing hydrophobic, cross linking functional group be used to prepare polymers which have pKa, $n$, $Tg$ and average molecular weight values within the aforesaid ranges and which can attain suitable cross linking densities. Generally, hydrophobic cross linking functional groups are relatively low in cross linking reactivity, but are advantageous in that in the heating step, they bring about heat reflow prior to cross linking reaction to make it possible to form smooth coated surfaces.

Based on the above-mentioned viewpoints, the inventors examined resin capable of meeting the objects of the present invention to find that the present invention can be achieved by using as the coating resin a copolymer composed of 93.5–35 mole percent of a component (A), which is a monomer mixture comprising at least one monomer represented by the general formula $$CH_2=C-COOR_1$$
$$|$$
$$R \quad\quad [III]$$

wherein R is a hydrogen atom or a methyl group, and $R_1$ is a branched or straight chain alkyl group having 1–18 carbon atoms, and at least one other copolymerizable unsaturated monomer; 1.5–15 mole percent of a component (B), which is a compound represented by the general formula $$CH_2=C-COOH$$
$$|$$
$$(CH_2)_mCOOH \quad\quad [IV]$$

wherein $m$ is 1 or 2; and 5–50 mole percent of a component (C), which is at least one compound represented by the general formula

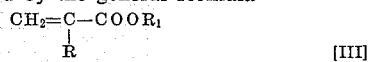

$$CH_2=C-CO-N\begin{matrix}H\\ \\R_2-OR_3\end{matrix}$$
$$|$$
$$R \quad\quad\quad\quad [V]$$

wherein R is as defined above, $R_2$ is a branched or straight chain alkylene group having 1–8 carbon atoms, and $R_3$ is a branched, cyclic or straight chain alkyl group having 1–6 carbon atoms.

The compound represented by the general Formula III, which is used in the present invention is an acrylate or methacrylate in which the alkyl group represented by $R_1$ is a methyl, ethyl, n-propyl, isopropyl, n-butyl, secondary butyl, tertiary butyl, pentyl, 2-ethylhexyl, monyl, decyl, dodecyl or stearyl group. In case the hardness of the resulting film and the bath stability of the coating bath employed are to be taken into consideration, it is desirable to use, in a suitable combination, a long chain alkyl acrylate or methacrylate and a short chain alkyl acrylate or methacrylate. The said other copolymerizable unsaturated monomer is styrene, an α-alkyl-substituted styrene derivative, acrylonitrile, or a hydroxyalkyl acrylate or methacrylate represented by the general formula $$CH_2=C-COO-R_2-OH$$
$$|$$
$$R \quad\quad [VI]$$

wherein R and $R_2$ are as defined above. Concrete examples of said hydroxyalkyl acrylates and methacrylates are those in which the hydroxyalkyl group is a 2-hydroxyethyl, 2-hydroxypropyl, 2-hydroxybutyl, 2-ethyl-2-hydroxyethyl or 1-hexyl-2-hydroxyethyl group.

The above-mentioned component (A) is a monomer mixture constituting a trunk component of the high polymer, which is used as a component of the coating composition. A particularly excellent coating composition for electrodeposition coating can be obtained when there is used, as the component (A), a monomer mixture prepared by mixing in a molar ratio of 99.9/0.1 to 40/60 a monomer represented by the general Formula III with other copolymerizable unsaturated monomer.

As carboxylic acids constituting the component (B), there may be used, in addition to the carboxylic acids represented by the general Formula IV, acrylic, crotonic, fumaric and acids, and anhydrides of said acids. These acids, however, are inferior in copolymerizability with other monomers employed, and therefore the use of said acids is not desirable. Polymers to be used in the electrodeposition coating methods are required to be uniform in structure and the like, particularly in pKa value. If polymers having a wide pKa value distribution are used, polymers low in pKa value migrate or orient, with lapse of time, into the aqueous phase, whereby not only the stability of the coating bath is injured but also the properties of the resulting films are degraded. It is therefore a required condition to use itaconic or α-methyleneglutaric acid, which is excellent in copolymerizability.

The above-mentioned acids not only play important roles to impart electrophoretic properties to the coating material components but also are elements indispensable for dispersing the coating material components into an aqueous medium. They are important also as cross linking reaction catalysts in the baking step of films. Further, in the case of pigmented coating materials using pigments in combination, they display effects of improving the affinity of the pigments for the resin components. However, the above-mentioned acids are hydrophilic compounds, so that when used in large amounts, they bring about the degradation in characteristics of the resin obtained and in physical properties of the resulting films. It is therefore desirable to use the acids in amounts of from 1.5 to 15 mole percent.

A great characteristic of the present invention resides in the use of the compounds represented by the general Formula V. Typical as said compounds are acrylamides or methacrylamides in which, in the N-alkoxyalkyl group, the N-alkoxy group represented by $R_3O-$ is a methoxy, ethoxy, butoxy, n-propoxy, pentoxy or

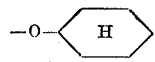

group, and the alkylene group represented by —$R_2$— is a methylene, ethylene, propylene, hexylene or 2-ethylhexylene group. These compounds are more hydrophobic cross linking functional monomers than acrylamides, methacrylamides and N-methylol acrylamides or methacrylamides, and can be used in considerably large amounts without giving any detrimental effect to the pKa and $n$ values of the resulting polymers. Further, they give films having not only a desired cross linking density but also heat reflowability, and therefore glossy coated surfaces can be obtained. Among these monomers, N-butoxymethyl acrylamide and N-butoxymethyl methacrylamide can be said to be particularly preferable comonomers in that not only they are excellent in copolymerizability with other monomers and the resulting polymers are favorable in storage stability, but also they are prominent in affinity for pigments, melamine resins and epoxy resins which are used in combination therewith. The amounts of these monomers employed are in the range of 5–50 mole percent, preferably 10–30 mole percent, when the pKa and $n$ values of the resulting polymers are taken into consideration.

For the preparation of polymers usable in the present invention, the aforesaid monomers may be polymerized, according to an ordinary polymerization method, in an ordinary organic solvent in the presence of desired amounts of a radical polymerization catalyst and a molecular weight modifier. However, in case the dispersion stability in water of the resulting polymer and the stability with lapse of time of the aqueous bath are taken into consideration, the use of organic solvents miscible with water is particularly desirable. As these organic solvents, there are alcohols such as methanol, ethanol, butanol, propanol, and isopropyl alcohol; glycols such as ethylene glycol, propylene glycol, hexylene glycol, and diethylene glycol; Cellosolves such as methyl Cellosolve, ethyl Cellosolve, and butyl Cellosolve; or aqueous mixtures thereof. Great advantages attained by use of the above-mentioned polymerization solvents are as mentioned below.

In the step of dispersing a polymer in water, it is not necessary to effect such solvent substitution as in the case where a water-insoluble polymerization solvent has been used. Further, in case solvent substitution has been effected, the resulting polymer itself has pKa values of a certain range, in general, so that a polymer low in pKa value tends to migrate into the aqueous phase. Accordingly, the polymer is lowered in stability during storage as a resin solution. In contrast thereto, in case a water-miscible organic solvent has been used, no such solvent substitution is necessary in the step of dispersing the polymer in water. Moreover, the polymer is stored in the organic solvent, and therefore the dissolved state of the polymer does not vary to make it possible to obtain an electrodeposition coating composition, which is markedly excellent in stability.

As the polymerization initiator to be used in the preparation of the polymer, any of the ordinary radical polymerization initiators may be used. Examples of such polymerization initiator are benzoyl peroxide, cumene hydroperoxide, ditertiary butyl peroxide, azobisisobutyronitrile, and azobisisovaleronitrile. As the molecular weight modifier, there may be used such mercaptan as tertiary dodecyl mercaptan, n-dodecyl mercaptan, butyl mercaptan, or 2-mercaptoethanol.

In order to disperse the resulting copolymer in water, it is necessary that the copolymer be neutralized. Neutralizing agents usable in the above case are ammonia, primary amines, secondary amines, tertiary amines, hydroxyalkylamines thereof, or salts thereof. However, these neutralizing agents give adverse effects, depending on the degree of hydrophilic properties thereof, on the pKa and $n$ values of the polymers, and therefore care must be taken.

For the preparation of the above-mentioned N-alkoxyalkylamide copolymer there is thought of a process using isolated N-alkoxyalkyl acrylamides or methacrylamides. In addition thereto, there are, as disclosed in U.S. Pat. No. 2,870,611 and British Pat. No. 1,115,130, the so-called polymer-modifying processes in which interpolymers having amide groups or N-methylolamide groups are obtained using acrylamides, methacrylamide, N-methylolacrylamides or N-methylolmethacrylamides as comonomers, and then the said amide groups are N-alkoxyalkylated by use of aldehydes and alcohols. However, according to the above-mentioned polymer-modifying processes, hydrophilic groups are liable to remain. Further, the solvents employed are water-insoluble organic solvents, and therefore the resulting polymer solutions should be subjected to solvent substitution to bring about detrimental effects on the pKa and $n$ values of the polymers. Moreover, the polymers are deteriorated in heat flowability and the electrodeposition coating baths are lowered in bath stability. According to the aforesaid processes, therefore, it is impossible to obtain the present coating compositions for electrodeposition coating which are suitable for one-coat finish and which have excellent film-forming ability. Further, when the above processes are employed, it is necessary to add acid catalysts in order to completely N-alkoxyalkylate the amide groups or N-methylolamide groups contained in the polymers. These acid catalysts undesirably bring about detrimental effects at the time of electrodeposition coating, and therefore it is impossible to obtain, according to said processes, electrodeposition coating materials suitable for one-coat finish. Accordingly, in order to obtain an electrodeposition coating material, it becomes an essential condition to use an N-alkoxyalkyl acrylamide or methacrylamide as a comonomer. In this case, however, there arises a great problem in that isolated N-alkoxy-alkyl acrylamide or methacrylamide is expensive.

In view of the above, the present inventors examined processes for inexpensively preparing N-alkoxyalkyl acrylamides and methacrylamides which are used as comonomers. As the result, the inventors have accomplished the following two methods:

The first method is such that an N-alkylol acrylamide or methacrylamide is used as a starting material; a mixture comprising a lower aliphatic alcohol and an organic solvent azeotropic with water, or a vinyl monomer azeotropic with water, is used as a dehydrating agent; and the unsaturated acid (B), which is an essential component of the present composition is used as a catalyst for N-alkoxyalkylation of the N-alkylol group.

The second method is such that acrylamide or methacrylamide is used as a starting material; a mixture or addition product of formaldehyde and a lower aliphatic alcohol is used as a modifying agent for the amide group; and the same dehydrating agent and acid catalyst as in the first method are used. According to said methods, a monomer mixture comprising the component (C) and the component (B) can be easily obtained by feeding to the monomers a given amount of an acid catalyst, which is an element indispensable in the present invention. Further, when a vinyl monomer azeotropic with water is used as the dehydrating agent, a monomer mixture comprising (A), (B) and (C) can be obtained with ease and at low cost. As the acid catalyst, α-methyleneglutaric or itaconic acid, which is useful also as a comonomer, is preferably used. As the solvent for dehydration, an aromatic hydrocarbon such as benzene or toluene, or a vinyl monomer such as acrylonitrile, displays prominent effects.

The present coating compositions for electrodeposition coating are of the self-cross linking type and give films excellent in physical properties. However, in order to further improve the properties of the resulting films, such as hardness, corrosion resistance and the like, it is desirable that melamine resins or epoxy resins be used in combination. The improvement is achieved by blending 60 parts by weight or less of N-alkoxymethylmelamine and/or epoxy resins with 100 parts by weight of the resin component comprising 03.5 to 35 mole percent of the component (A), 1.5 to 15 mole percent of the component (B), and 5 to 50 mole percent of the component (C). Usable as such melamine resins are N-alkoxymethyl melamines, preferably those in which the alkyl group of the alkoxymethyl group has 1-4 carbon atoms. Alternatively, these may be N-alkoxymethyl melamines in which the N-alkylol group has been left in part. Usable as the epoxy resins are those having an epoxy equivalent of 100-2,000. These include, for example, condensation products of polyethylene glycol or polypropylene glycol with epichlorohydrin; triglycidyl isocyanurate; epoxy resins obtained from epichlorohydrin and Bisphenol A; epoxidized resins; vinyl cyclohexene dioxide; diglycidyl phthalate ester; and glycerine triglycidyl ether. These epoxy resins display great effects particularly in that they can improve the corrosion resistance of the resulting films. Further, these compounds are ordinarily used in the form of solutions in suitable solvents, but may also be used in the form of powders.

In order to disperse the polymer, obtained in the above manner, in an aqueous medium and to use the dispersion as an electrodeposition coating bath, the specific electroconductivity of the bath at the time of preparation should be controlled to 150–800 $\mu$ /cm. (measured for 11% by weight of solids, measured at a bath temperature of 25° C.). If the specific electroconductivity of the bath is more than 800 $\mu$ ʊ/cm., the electrodeposition of the coating material components onto the surface of a metal to be coated becomes low in efficiency. When the specific electroconductivity is less than 150 $\mu$ʊ/cm., the amount of coating material particles electrodeposited onto the surface of a metal to be coated increases, but, on the other hand, the degree of racking of coating material particles on to the surface of material to be coated decreases to bring about such undesirable phenomena that the adhesion between the resulting film and the material to be coated is lowered and the solvent is left in the film. It is therefore desirable that the specific electroconductivity of the electrodeposition coating bath be adjusted to 200–600 $\mu$ʊ /cm.

A polymer obtained according to an ordinary polymerization process is a mass of polymers having considerably wide distributions of pKa, $n$ and molecular weight values. Therefore, in case the conventional electrodeposition coating material, which contains such a polymer as mentioned above, is used to form an electrodeposition bath, polymers low in pKa value migrate into the aqueous phase with lapse of time, whereby the whole system of the coating bath is lowered in apparent pH, and the specific electroconductivity of the bath increases and, at the same time, becomes closer to a definite value. Further, in the above process, there occur such phenomena as variation in dissolved state of coating material particles lack in the difference of electrophoretic migration of the particles, and formation of precipitate. Owing to such variation of coating bath with lapse of time, the resulting film is undesirably degraded in gloss and is deteriorated in physical properties due to increase in film thickness.

It is the electrodeposition coating material of the present invention that has been developed in order to overcome such undesirable phenomena as mentioned above. However, even in the case of an electrodeposition coating bath prepared by using the present coating material, which contains the polymer obtained under such strict conditions as above, there are observed such phenomena that the bath is lowered in pH and is increased in specific electroconductivity when allowed to stand for a long period of time after preparation, with the result that the resulting film is degraded in gloss and deteriorated in physical properties. Such phenomena are considered ascribable to the fact that water-soluble polymers low in pKa value orient and migrate into the aqueous phase, as mentioned previously. When said water-soluble polymers, which have migrated into the aqueous phase, are removed from the bath according to a dialysis process or a process using ion exchange compounds, e.g. ion exchange resins or membranes, the pH and specific electroconductivity of the bath can be brought back to substantially the same pH and specific electroconductivity values at the time of preparation of the bath, whereby the gloss and properties of the resulting bath can be maintained constant.

In addition to the above process for the stabilization of electrodeposition coating bath by use of the ion exchange compounds, there is a method in which an amphoteric electrolyte capable of acting as a base in the vicinity of the pole of a material to be coated is added to the electrodeposition coating bath, whereby the stability of the bath can be greatly improved. The phenomenon taking place in the above method has not been clarified in detail, but is considered accountable to the mild deposition of coating material particles in the vicinity of the pole. Preferable as such amphoteric electrolyte are those having an isoelectric point of 6.5–8.5, e.g. amino acids such as L-histidine, L-glycine, and the like. The bath stability can also be improved by preventing the coating material particles from agglomeration in the aqueous medium, or by adding to the coating bath a nonionic surface active agent effective for preventing polymers low in pKa value from elution into the aqueous medium. As the nonionic surface active agent, there may be used, for example, a copolymer of ethylene oxide with propylene oxide. In case a high anti-rust property is desired to be imparted to the resulting film, an alkylamine, preferably a water-insoluble alkylamine, which can neutralize the acid group contained in the polymer, may be added during the curing of the film. The water-insoluble alkylamine includes n-butylamine, n-hexylamine, n-octylamine and laurylamine.

Electrodeposition coating materials, in which containing pigment have heretofore been obtained by use of pigmented paste prepared by neutralizing a coating material to impart water dispersibility thereto, adding a pigment to the coating material, and then kneading the resulting mixture. However, the coating materials for electrodeposition coating, which are obtained according to such a process as above, variously differ in stability in aqueous bath. Further, the development of coating materials excellent in dispersion stability has conventionally been effected in a mere trial and error manner, and processes for the analysis and solution of causes for said difference in both stability have not yet been found.

In view of such actual state as mentioned above, the present inventors made studies, paying attention to the point that no matter how excellent resins for one-coat finish had been developed, the pigmented paste material having excellent characteristics and suitable for one-coat finish could not be obtained unless the characteristics of pigments employed should also be taken into consideration. As the result, the inventors have found that a pigmented coating material for electrodeposition coating which has excellent characteristics and which is suitable for one-coat finish can be obtained by use of a resin which, after neutralization, shows such characteristics in the Formula I as $8.0 \leq pKa$, $0.5 < n < 1.5$ and $30\% < \alpha < 80\%$, and of a pigment which satisfies the relationship represented by the formula $$|pKp - pKa| \geq 0.1 \qquad [VII]$$

wherein pKp is the acidity of the pigment, and pKa is the acidity of the resin.

The dispersion stability of a coating material in an aqueous bath containing a pigment and a resin is greatly affected by the wettability between the resin and the pigment. In the present invention, the step of coating the pigment with the resin is carried out in an organic solvent, and it is considered that the wetting phenomenon between resin and pigment progresses according to the process of the formula

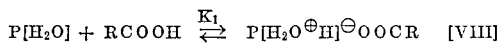

wherein $P[H_2O]$ represents a pigment having adsorption water, and RCOOH represents a carboxylic acid resin. Thus, the dispersion stability in water of the pigment, which has once been coated, is greatly dominated by the characteristics of the resin employed. It is considered that $K_1$ in the process of the Formula VIII is proportional to the value of $|pKp-pKa|$, i.e. the difference between pKa, which represents the proton releasability of the carboxylic acid resin, and pKp, which represents the proton-discharging force of $P[H_2O]$. The greater the value of $|pKp-pKa|$, the more firmly the pigment is coated with the resin, and the dispersibility of the resultant is comparable to that of a resin containing no pigment, whereby the effect of using the resin suitable for one-coat finish and having excellent pKa and $n$ values can also be displayed.

In case a pigment and a resin in such a relationship as $pKp \rightleftharpoons pKa$ are used, the wetting phenomenon according to the Formula VIII between the pigment and the resin becomes a markedly small value, and the water-dispersibility of the pigment itself is also inhibited. It is therefore considered that the resulting aqueous bath is lowered in dispersion stability and, at the same time, the pigment and the resin tend to show different behaviors in the electrodeposition coating step, with the result that the properties of the resulting film are also lowered. Accordingly, in order to obtain a pigmented coating material, which has excellent dispersion stability in water and which is suitable for one-coat finish, it becomes necessary that the condition $|pKp-pKa| \geq 0.1$ be satisfied.

In the present invention, pKa is a value measured under the conditions set forth below.

A water-insoluble pigment has an amphoteric property, and when the pigment is dispersed in an alkaline or acidic medium, it shows excellent dispersibility, whereas at about a neutral pH, the dispersibility thereof becomes markedly low. In a dispersion at an alkaline pH, the pigment is negatively charged, and the pH lowers with increasing pigment concentration. Accordingly, $OH^-$ is adsorbed on the pigment surface, and the pigment disperses according to the equilibrium equation

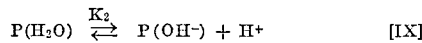

Wherein P is the pigment. Since the dispersibility of the pigment becomes higher with increasing $P(OH^-)$, there is established the equation $$K_2 = [P(OH^-)][H^+]/[P(H_2O)]$$

Accordingly, $$pH = pK_2 + \log \frac{[P(OH^-)]}{[P(H_2O)]} \qquad [X]$$

When $pK_2$ is replaced by pKp, it is possible, in view of the relationship between the term log $$\frac{[P(OH^-)]}{[P(H_2O)]}$$

which represents the dispersibility of the pigment, and the pH of aqueous bath, to define pKp by the pH at the time when the pigment initiates to disperse at the alkaline side. When the pH at said time is measured, the value of pKp can be calculated.

As pigments usable in the present invention, there are inorganic pigments such as titanium oxide, red oxide, carbon black, cobalt blue, ultramarine blue, cerulean, manganese blue, mars violet, chromium oxide, cobalt chromium green, yellow iron oxide, cadmium yellow and barite; and organic pigments such as Permanent Red 4R, Hansa Yellow and Phthalocyanine Blue. In addition thereto, any pigments may be used so far as they are difficultly soluble in water. However, the pigments should be so selected as to necessarily satisfy the relationship $|pKp-pKa| \geq 0.1$.

The present coating compositions for electrodeposition coating can give, according to any of clear coating and colored enamel coating, not only films having excellent physical and chemical properties but also films having white and light clear colors and having excellent surface gloss.

In the present invention, the coating operations may be effected in such a manner that electrodeposition coating is carried out ordinarily at a voltage of 40–200 v., and the resulting film is washed with water, is dried, and is then baked at 140°–250° C. for about 30 minutes.

The coating compositions of the present invention are extremely significant in that even in the case of chemically treated cold rolled steel plates, which have heretofore been considered to be such that films having excellent surface gloss and prominent properties are difficultly formed on the surfaces thereof according to electrodeposition coating method and by one-coat finish, the present coating compositions can form such excellent films as in the case of cold rolled steel plates.

The present invention is illustrated in further detail below with reference to examples, in which all parts and percentages are by weight.

EXAMPLE 1

(A) Preparation of a monomer mixture comprising N-butoxymethyl acrylamide and itaconic acid:

The monomers shown below were charged into a three-necked flask fitted with a stirrer, a decanter and a thermometer, and the mixture was dehydration-condensed at 70–97° C. for 6 hours.

| | Parts |
|---|---|
| Acrylamide | 444 |
| n-Butanol | 760 |
| Benzene | 700 |
| Itaconic acid | 162.5 |
| 40% butanol solution of formaldehyde | 538 |
| Hydroquinone monomethylether | 3.5 |

The decanter had previously been charged with benzene, and the time when the amount of effluent water had reached a given amount was deemed as the terminal of the condensation reaction. The resulting product was analyzed according to gas chromatography to find that the conversion of acrylamide to N-butoxymethyl acrylamide was 96.5%, 2,500 parts of the said product was charged with 1055 parts of isopropanol, and 1055 parts was distilled off as an azeotropic mixture of benzene with isopropanol.

(B) The monomers shown below were charged into the flask employed in (A), and a monomer mixture comprising N-butoxymethyl acrylamide and itaconic acid was obtained in the same manner as in (A):

| | Parts |
|---|---|
| N-methylol acrylamide | 632 |
| n-Butanol | 1030 |
| Benzene | 703 |
| Itaconic acid | 162.5 |
| Hydroquinone monomethylether | 3.5 |

The resulting product was analyzed according to gas chromatography to find that the conversion of N-methylol acrylamide to N-butoxymethyl acrylamide was 97.5%. 2,500 parts of the said product was charged with 1055 parts of isopropanol, and benzene was distilled off as an azeotropic mixture with isopropanol.

(C) In the same manner as in (A), a monomer mixture comprising N-butoxymethyl acrylamide, itaconic acid and acrylonitrile was obtained from the monomers shown below.

| | Parts |
|---|---|
| Acrylamide | 444 |
| 40% butanol solution of formaldehyde | 538 |
| Acrylonitrile | 700 |
| Itaconic acid | 162.5 |
| Hydroquinone monomethylether | 3.5 |
| n-Butanol | 760 |

The resulting product was analyzed according to gas chromatography to find that the conversion of acrylamide to N-butoxymethyl acrylamide was 96.0%.

(D) In the same manner as in (A), a monomer mixture comprising N-butoxymethyl acrylamide and methacrylic acid was obtained from the monomers shown below:

| | Parts |
|---|---|
| N-methylol acrylamide | 632 |
| n-Butanol | 1030 |
| Benzene | 703 |
| Methacrylic acid | 120 |
| Hydroquinone monomethylether | 3.5 |

The resulting product was analyzed according to gas chromatography to find that the conversion of N-methylol acrylamide to N-butoxymethyl acrylamide was 96.3%. This product was carefully concentrated, and N-butoxymethyl acrylamide having a boiling point of 110°–115° C./1 mm. Hg was isolated, yield 85%.

(E) In the same manner as in (A), a monomer mixture comprising N-butoxymethyl acrylamide and α-methyleneglutaric acid was obtained from the monomers shown below:

| | Parts |
|---|---|
| Acrylamide | 444 |
| 40% butanol solution of formaldehyde | 538 |
| n-Butanol | 760 |
| Benzene | 700 |
| α-Methyleneglutaric acid | 180 |
| Hydroquinone monomethylether | 3.5 |

The resulting product was analyzed according to gas chromatography to find that the conversion of acrylamide to N-butoxymethyl acrylamide was 95.5%.

EXAMPLE 2

The compounds shown below were charged into a four-necked flask fitted with a stirrer, a thermometer and a cooler, and the mixture was polymerized in a nitrogen atmosphere at 68° C. for 6 hours and then at 75° C. for additional 2 hours.

| | Parts |
|---|---|
| Ethyl acrylate | 271 |
| Styrene | 166 |
| N-butoxymethyl acrylamide | 100 |
| Itaconic acid | 12.4 |
| 2-mercaptoethanol | 5.8 |
| Azobisisobutyronitrile | 24 |
| Isopropanol | 427 |

The resulting copolymer solution was neutralized by addition of 6.65 parts of β-dimethylaminoethanol to obtain a resinous solution having a solids content of 57.2 wt. percent, an acid number of 9.8, Tg. of 15° C., pKa of 8.7, $n$ of 0.9 and α of 45%. To 100 parts of this resin solution, 75 parts of titanium oxide having pKp of 9.53 was added, and the mixture was ground in a ball mill for 24 hours. The mixture was further charged with 200 parts of the resin solution and was ground for additional 24 hours to obtain a white pigmented paste. This enamel was used to prepare an electrodeposition coating bath having a solids concentration of 12.8 wt. percent, a pH of 8.42, a specific electroconductivity of $1.75 \times 10^{2} \mu$ ℧/cm. (measured at 25° C. when the solid content was 11%; the same shall apply hereinafter). Using the thus prepared coating bath, a cold rolled steel plate, a zinc phosphate-treated steel plate, and an ferric phosphate-treated soft steel plate were individually subjected to electrodeposition coating at a bath temperature of 25° C. for 3 minutes at 60 v. (distance between electrodes=40 mm.; cathode area/anode area=5/7). After water-washing and air-drying, the resulting films were baked at 180° C. for 30 minutes. The efficiencies of the thus formed films were as shown in Table 1.

TABLE 1

| | Substrate | | |
|---|---|---|---|
| Item | Cold rolled steel plate | Ferric phosphate-treated plate | Zinc phosphate-treated plate |
| Gloss value (60°) | 90.5 | 89.1 | 86.9 |
| Thickness ($\mu$) | 28 | 26 | 29 |
| Pencil hardness | 2H | 2H | 2H |
| Cross cut | 100/100 | 100/100 | 100/100 |
| Solvent resistance: | | | |
| Xylene | 4 | 4 | 4 |
| Isopropanol | 4-5 | 4 | 4 |
| Acetone | 5 | 5 | 5 |
| Alkali resistance | 5 | 5 | 5 |
| Acid resistance | 5 | 5 | 5 |

In the above table:

Gloss value was measured according to 60° mirror surface reflection method.

Cross cut value was measured in such a manner that squares of 1 mm. in side were drawn with a needle on the surface of the film and were peeled off by use of an adhesive tape, and the number of the remaining squares was represented by percentage.

Solvent resistance was measured in such a manner that the film surface of the coated plate was rubbed 20 times with a gauze impregnated with the organic solvent, and the damaged degree of the film surface was evaluated according to a 5-grading system. The best value was represented by 5, and the worst value by 1.

Alkali resistance was measured in such a manner that a spot of a 5% aqueous caustic soda solution was placed on the film surface of the coated plate for 24 hours and the damaged degree of the film was evaluated according to a 5-grading system.

Acid resistance was measured in such a manner that a spot of a 5% aqueous hydrochloric acid solution was placed on the film surface of the coated plate and the damaged degree of the film was evaluated according to a 5-grading system.

Substrate was a cold rolled steel plate of 70 mm. x 150 mm. x 0.8 mm., which was used either as such or after treatment with an anti-rust surface treating agent.

From the results shown in Table 1, it is evident that the films formed by use of the present coating composition is excellent not only in gloss but also in efficiencies and that the coating composition of the present invention is suitable for one-coat finish.

EXAMPLE 3

The compounds shown below were charged into the same device as in Example 2, and the mixture was polymerized for 12 hours in the same manner as in Example 2 to obtain a resin solution.

| | Parts |
|---|---|
| 2-ethylhexyl acrylate | 806 |
| Styrene | 520 |
| N-butoxymethyl acrylamideitaconic acid mixture obtained in Example 1(B) | 965 |
| Itaconic acid | 16.5 |
| Azobisisobutyronitrile | 59.0 |
| 2-mercaptoethanol | 22.5 |
| Isopropanol | 763 |

To the thus obtained resin solution, 44.4 parts of β-dimethylaminoethanol was added to prepare a resin having Tg of −9° C., pKa of 9.20, $n$ of 1.17, and α of 40%. 100 parts of this resin solution was charged with 75 parts of titanium dioxide having pKp of 906, and the mixture was ground in a ball mill for 24 hours. The mixture was further charged with 200 parts of the resin solution and was ground to obtain a white pigmented paste. This enamel paste was used to prepare an electrodeposition coating bath having a solids concentration of 13%, a pH of 9.02 and a specific electroconductivity of 2.24× $10^2$ $\mu\mho$/cm. (at the time when the solid content was 11%). Using the thus prepared coating bath, a cold rolled steel plate, a zinc phosphate-treated steel plate and an ferric phosphate-treated steel plate were individually subjected to electrodeposition coating at a bath temperature of 25° C. for 3 minutes at 80 v. under the same electrode conditions as in Example 2. After water-washing and air-drying, the resulting films were baked at 180° C. for 30 minutes. The efficiencies of the thus formed films were as shown in Table 2.

TABLE 2

| Item | Substrate | | |
|---|---|---|---|
| | Cold rolled steel plate | Ferric phosphate-treated plate | Zinc phosphate-treated plate |
| Gloss value | 86.3 | 86.5 | 84.3 |
| Thickness ($\mu$) | 38.0 | 41.0 | 34.6 |
| Pencil hardness | F-H | F-H | F-H |
| Cross cut | 100/100 | 100/100 | 100/100 |
| Solvent resistance: | | | |
| Xylene | 5 | 5-4 | 5-4 |
| Isopropanol | 5 | 5 | 5 |
| Acetone | 5 | 5 | 5 |
| Alkali resistance | 5 | 5 | 5 |
| Acid resistance | 5-4 | 5-4 | 5-4 |
| Erichsen value (mm.) | 9.0 | 8.1 | 7.7 |
| Impact resistance (cm.) | >50 | >50 | >50 |
| Bending test (mm.) | 2 | | |
| Salt spray test (mm.) | 12.5 | 12.5 | 3.5 |

In Table 2, other items than impact resistance, bending test and salt spray test are the same as in Table 1.

Impact resistance was measured in such a manner that onto the film surface, an iron hammer having a diameter of ½ inch and a weight of 500 g. was vertically dropped from a certain height, and the impact resistance of the film was represented by the height of the iron core at the time when the film surface had been damaged.

Bending test was carried out in such a manner that a core of steel rod having a diameter of x mm. was disposed on the back side of the coated steel sheet and the steel plate was bent to an angle of 360°. The result of the bending test was represented by the diameter of a core of steel rod at the time when the film surface had been damaged by said test.

Salt spray test was carried out in such a manner that the film was lineally cut to form a lineally cut portion on the film surface and was sprayed with a 5% aqueous sodium chloride solution at 40° C. for 48 hours, and then the cut portion was peeled off by use of an adhesive tape. The result of the salt spray test was represented by the width of peeled film at the time when the film had been peeled.

The variations with lapse of time of coating baths obtained in the above manner were observed on the basis tained in the above manner above manner wree observed of gloss values of the resulting films. The results were as shown in Table 3.

films having excellent efficiencies. In Table 3, (Exc) in the column 17th day shows that an ion exchange method was applied on the 17th day. When an electrodeposition coating bath is allowed to stand for a considerably long period of time, the elution of water-soluble polymers takes place to lower the pH of the bath and to increase the specific electroconductivity thereof, whereby the resulting film is deteriorated in efficiencies. If, in this case, the water-soluble polymers eluted into the bath are removed by means of an ion exchange resin, the bath can be restored to a bath which is high in stability and which can give a film excellent in efficiencies, as is clear from Table 3.

EXAMPLE 4

A mixture comprising the compounds shown below was polymerized under the same conditions as in Example 3, and was neutralized with 17.8 parts of $\beta$-dimethylaminoethanol to obtain a resin solution having a solids content of 57.2%, an acid number of 19.6, and a viscosity of U (Gardner).

| | Parts |
|---|---|
| 2-ethylhexyl acrylate | 276 |
| Styrene | 207 |
| 2-hydroxyethyl methacrylate | 31.3 |
| N-butoxymethyl acrylamide-itaconic acid mixture obtained in Example 1(B) | 389 |
| Itaconic acid | 6.5 |
| Isopropanol | 312 |
| Azobisisobutyronitrile | 22.4 |
| 2-mercaptoethanol | 6 |

The thus obtained resin had Tg of −1.5° C., pKa of 8.73, n of 1.15, and α of 40%. The resin solution was treated in the same manner as in Example 3 to obtain a white pigmented paste. This paste was used to prepare a coating bath having a solids concentration of 13%, a pH of 8.6, and a specific electroconductivity of 3.57×10² $\mu\mho$/cm. (at the time when the solids content was 11%). Subsequently, electrodeposition coating and baking were effected under the same conditions as in Example 3. The efficiencies of the resulting films were as shown in Table 4.

TABLE 4

| Item | Substrate | | |
|---|---|---|---|
| | Colled rolled steel plate | Ferric phosphate-treated plate | Zinc phosphate-treated plate |
| Gloss value | 85.2 | 83.2 | 82.2 |
| Thickness ($\mu$) | 28 | 28 | 26 |
| Pencil hardness | F | F | H |
| Cross cut | 100/100 | 100/100 | 100/100 |
| Solvent resistance: | | | |
| Xylene | 4-5 | 4-5 | 4-5 |
| Isopropanol | 4-5 | 4-5 | 4-5 |
| Acetone | 4 | 4-5 | 4-5 |
| Alkazi resistance | 5 | 5 | 5 |
| Acid resistance | 5 | 4 | 4 |

TABLE 3

| Substrate | Elapsed days | | | | |
|---|---|---|---|---|---|
| | 0 | 13 | 17 | 17 (Exc) | 25 |
| Colled rolled steel plate | 84.1 | 76.5 | 59.4 | 81.6 | 81.3 |
| Ferric phosphate-treated plate | 81.8 | 70.3 | 68.4 | 75.9 | 79.5 |
| Zinc phosphate-treated plate | 73.5 | 69.1 | 70.5 | 69.1 | 76.3 |
| Specific conductivity of bath ($\mu v./cm.$) | 2.24×10² | 5.39×10² | 5.63×10² | 4.83×10² | 5.90×10² |
| pH of bath | 9.02 | 8.77 | 8.76 | 8.90 | 8.70 |

As is clear from the results set forth in Table 3, the coating compositions of the present invention are favorable in bath stability, and the baths prepared by use of the present coating compositions can give, even when allowed to stand for a considerably long period of time,

EXAMPLE 5

A mixture comprising the compounds shown below was polymerized under the same conditions as in Example 3, and was neutralized with 17.8 parts of $\beta$-dimethylaminoethanol to obtain a resin solution having a solids content of 57.5%, a viscosity of Q (Gardner), and an acid number of 19.9.

| | Parts |
|---|---|
| 2-ethylhexyl acrylate | 234 |
| Ethyl acrylate | 100 |
| Styrene | 156 |
| N-butoxymethyl acrylamide distilled and isolated from the mixture obtained in Example 1(D) | 157 |
| Itaconic acid | 32.5 |
| Azobisisobutyronitrile | 22.5 |
| 2-mercaptoethanol | 9 |
| Isopropanol | 539 |

The resin obtained had $Tg$ of $-23.5°$ C., pKa of 8.79, $n$ of 1.11, and $\alpha$ of 40%. The resin solution was treated in the same manner as in Example 3 to form a white pigmented paste. This paste was used to prepare an electrodeposition coating bath having a solids concentration of 13%, a pH of 8.70, and a specific electroconductivity of $2.53 \times 10^2$ $\mu\mho$/cm. (at the time when the solids content was 11%). Subsequently, electrodeposition coating and baking were effected under the same conditions as in Example 3.

On the other hand, an aqueous solution containing 0.01 mol/l. of L-histidine was prepared and was adjusted to the same pH as that of the aforesaid electrodeposition coating bath. 50 g. of said aqueous solution was incorporated into 500 g. of the aforesaid coating bath to prepare another coating bath. The thus prepared two baths were individually subjected to tests with continuous stirring in open at 25° C. The results are shown in Table 5 by way of variations in gloss value and thickness of the resulting films.

TABLE 5

| Test days | No incorporation | | Initially incorporated | | Incorporated after 20 days | |
|---|---|---|---|---|---|---|
| | Gloss | Thickness | Gloss | Thickness | Gloss | Thickness |
| 0 | 86.3 | 43 | 85.6 | 38 | 86.3 | 43 |
| 20 | 20.0 | 100 | 81.1 | 34 | 82.5 | 37 |

NOTE: Test plate employed was a zinc phosphate-treated plate.

As is clear from the above table, the bath which has not been incorporated with the L-histidine solution is greatly lowered in stability as compared with the bath incorporated therewith. Further, the stability of a bath lowered in stability is improved by incorporation of the L-histidine solution in an amount equal to that of the bath.

EXAMPLE 6

This example shows the case where a long chain acrylate was used in combination with a short chain acrylate in order to impart heat flowability to the resulting film.

A mixture comprising the compounds shown below was polymerized under the same conditions as in Example 3, and was neutralized with 44.4 parts of β-dimethylaminoethanol to obtain a resin solution having a solids content of 57.7%, a viscosity of U (Gardner), and an acid number of 19.3.

| | Parts |
|---|---|
| Ethyl acrylate | 447 |
| Lauryl methacrylate | 359 |
| Styrene | 520 |
| N-butoxymethyl acrylamideitaconic acid mixture obtained in Example 1 (B) | 965 |
| Itaconic acid | 16.5 |
| Azobisisobutyronitrile | 59.0 |
| 2-mercaptoethanol | 22.5 |
| Isopropanol | 763 |

The thus obtained resin had $Tg$ of 20° C., pKa of 9.15, $n$ of 1.18, and $\alpha$ of 40%. The resin was treated in the same manner as in Example 3 to form a white pigmented paste. This paste was used to prepare an electrodeposition coating bath having a solids content of 13%, a pH of 8.90, and a specific electroconductivity of $2.35 \times 10^2$ $\mu\mho$/cm. at the time when the solids content was 11%). Subsequently, electrodeposition coating and baking were effected under the same conditions as in Example 3. The efficiencies of the resulting films were as shown in Table 6.

TABLE 6

| | Substrate | | |
|---|---|---|---|
| Item | Colled rolled steel plate | Ferric phosphate-treated plate | Zinc phosphate-treated plate |
| Gloss value | 85.3 | 85.5 | 84.1 |
| Thickness (μ) | 37 | 39 | 35 |
| Pencil hardness | F-H | F-H | F-H |
| Cross cut | 100/100 | 100/100 | 100/100 |
| Solvent resistance: | | | |
| Xylene | 5 | 5 | 5 |
| Isopropanol | 5 | 5 | 5 |
| Acetone | 5 | 5 | 5 |
| Alkali resistance | 5 | 5 | 5 |
| Acid resistance | 5 | 5 | 5 |

EXAMPLE 7

This example shows the fact that even when a monomer mixture synthesized by use of acrylonitrile as an azeotropic dehydrating agent is used, films excellent in efficiencies are obtainable.

A mixture comprising the compounds shown below was polymerized in the same manner as in Example 3 and was neutralized with 8.9 parts of β-diethylaminoethanol to obtain a resin solution having a solids content of 59.6%, a viscosity of Y (Gardner), and an acid number of 10.5.

| | Parts |
|---|---|
| 2-ethylhexyl acrylate | 340 |
| Styrene | 234 |
| N-butoxymethyl acrylamide-itaconic acid-acrylonitrile mixture obtained in Example 1 (C) | 200 |
| Itaconic acid | 3.25 |
| Azobisisobutyronitrile | 22.5 |
| 2-mercaptoethanol | 6 |
| Isopropanol | 332.3 |

The resulting resin had $Tg$ of $-1.5°$ C., pKa of 8.7, $n$ of 1.19, and $\alpha$ of 40%. The resin solution was treated in the same manner as in Example 3 to obtain a white pigmented paste. This paste was used to prepare an electrodeposition coating bath having a solids content of 13%, a pH of 8.5, and a specific electroconductivity of $3.13 \times 10^2$ $\mu\mho$/cm. (at the time when the solids content was 11%). Subsequently, electrodeposition coating and baking were effected under the same conditions as in Example 3. The efficiencies of the resulting films were as shown in Table 7.

TABLE 7

| | Substrate | | |
|---|---|---|---|
| Item | Colled rolled steel plate | Ferric phosphate-treated plate | Zinc phosphate-treated plate |
| Gloss value | 83 | 82 | 80 |
| Thickness (μ) | 28 | 30 | 32 |
| Pencil hardness | F | F | F |
| Cross cut | 100/100 | 100/100 | 100/100 |
| Solvent resistance: | | | |
| Xylene | 5 | 5 | 5 |
| Isopropanol | 5 | 5 | 5 |
| Acetone | 5 | 5 | 5 |
| Alkali resistance | 5 | 5 | 5 |
| Acid resistance | 5 | 5 | 5 |

EXAMPLE 8

This example shows the fact that even when a monomer mixture is synthesized from an acrylamide of N-butoxymethyl acrylamide, a favorable resin for electrodeposition coating can be obtained.

Into the same device as in Example 2 were charged 50 parts of azobisisobutyronitrile, 10 parts of 2-mercaptoethanol, and a mixture comprising the compounds shown below.

| | Parts |
|---|---|
| Ethyl acrylate | 693 |
| Styrene | 426 |
| N-butoxymethyl acrylamideitaconic acid mixture obtained in Example 1 (A) | 486 |
| Isopropanol | 800 |

The resulting mixture was elevated in temperature in 2 hours. In this case, 5 parts of 2-mercaptoethanol and 3 parts of azobisisobutyronitrile were added, and the mixture was maintained at 68° C. After 2 hours, 3 parts of azobisisobutyronitrile was added, and the heating was continued for additional 2 hours. At the 6th hours from the beginning, the temperature was elevated to 75° C. and polymerization was effected for additional 2 hours. The resulting solution was neutralized by addition of 17.8 parts of β-dimethylaminoethanol to obtain a resin solution having a solids content of 54.3%, a viscosity of R (Gardner), and an acid number of 9.8. This resin Tg of 17.5° C., pKa of 9.0, n of 0.88, and α of 40%. The resin solution was treated in the same manner as in Example 3 to obtain a white pigmented paste. This paste was used to prepare an electrodeposition coating bath having a solids concentration of 13%, a pH of 8.55, and a specific electroconductivity of $2.50 \times 10$ μ℧/cm. (at the time when the solids content was 11%). Subsequently, electrodeposition and baking were effected under the same conditions as in Example 3. The efficiencies of the resulting films were as shown in Table 8.

TABLE 8

| | Substrate | | |
|---|---|---|---|
| Item | Coiled rolled steel plate | Ferric phosphate-treated plate | Zinc phosphate-treated plate |
| Gross value | 84.5 | 85.6 | 83.5 |
| Thickness (μ) | 22 | 26 | 26 |
| Pencil hardness | H | H | H |
| Cross cut | 100/100 | 100/100 | 100/100 |
| Solvent resistance: | | | |
| Xylene | 4 | 4 | 4 |
| Isopropanol | 5 | 4 | 5 |
| Acetone | 5 | 5 | 5 |
| Alkali resistance | 5 | 5 | 5 |
| Acid resistance | 5-4 | 5-4 | 5-4 |

EXAMPLE 9

This example shows the fact that if the resin employed is excessively high in Tg (glass transition temperature), no excellent film is obtainable.

A mixture comprising the compounds shown below was polymerized according to the process of Example 3 and was neutralized with 14.2 parts of β-dimethylaminoethanol to obtain a resin solution having a solids content of 56.5%, a viscosity of Z (Gardner), and an acid number of 19.3.

| | Parts |
|---|---|
| Ethyl acrylate | 50 |
| Methyl methacrylate | 50 |
| Styrene | 395 |
| N-butoxymethyl acrylamide | 78.5 |
| Itaconic acid | 26 |
| Azobisisobutyronitrile | 22.4 |
| 2-mercaptoethanol | 6 |
| Isopropanol | 372 |

This resin had Tg of 84° C., pKa of 8.60, n of 0.95, and α of 40%. The resin solution was treated in the same manner as in Example 3 to obtain a white pigmented paste. This paste was used to prepare an electrodeposition coating bath having a solids concentration of 13%, a pH of 8.8, and a specific electroconductivity of $4.9 \times 10^2$ μ℧/cm. (at the time when the solids content was 11%). Subsequently, electrodeposition and baking were effected under the same conditions as in Example 3. The efficiencies of the resulting films were as shown in Table 9, but the films had no smoothness and were low in throwing power.

TABLE 9

| | Substrate | | |
|---|---|---|---|
| Item | Coiled rolled steel plate | Ferric phosphate-treated plate | Zinc phosphate-treated plate |
| Gloss value | 30 | 28 | 29 |
| Thickness (μ) | 70 | 75 | 56 |
| Pencil hardness | 6H | 6H | 6H |
| Solvent resistance: | | | |
| Xylene | 4 | 4 | 4 |
| Isopropanol | 4 | 4 | 4 |
| Acetone | 4 | 4 | 4 |
| Alkali resistance | 1 | 1 | 1 |
| Acid resistance | 1 | 1 | 1 |

EXAMPLE 10

A mixture comprising the compounds shown below was polymerized according to the process of Example 3 and was neutralized with 44.4 parts of β-dimethylaminoethanol to obtain a resin solution having a solids content of 56.8% and an acid number of 19.5.

| | Parts |
|---|---|
| 2-ethylhexyl acrylate | 806 |
| Styrene | 520 |
| N-butoxymethyl acrylamide | 400 |
| α-Methyleneglutaric acid | 90 |
| Azobisisobutyronitrile | 59 |
| 2-merceptoethanol | 22.5 |
| Isopropanol | 753 |

The resin obtained had Tg of −8.0° C., pKa of 9.25, n of 1.15, and α of 40%. This resin was treated in the same manner as in Example 3 to obtain a white pigmented paste. This paste was used to prepare an electrodeposition coating bath having a solids content of 13%, a pH of 9.0, and a specific electroconductivity of $2.13 \times 10^2$ μ℧/cm. (at the time when the solids content was 11%). Subsequently, electrodeposition coating and baking were effected under the same conditions as in Example 3. The efficiencies of the resulting films were as shown in Table 10. As is clear from the results set forth in the table, the use of α-methyleneglutaric acid also results in films substantially the same in efficiencies as in the case where itaconic acid is used.

TABLE 10

| | Substrate | | |
|---|---|---|---|
| Item | Coiled rolled steel plate | Ferric phosphate-treated plate | Zinc phosphate-treated plate |
| Gloss value | 85.5 | 84.7 | 83.8 |
| Thickness (μ) | 40 | 39 | 39 |
| Pencil hardness | F-H | F-H | F-H |
| Cross cut | 100/100 | 100/100 | 100/100 |
| Solvent resistance: | | | |
| Xylene | 5 | 5 | 5 |
| Isopropanol | 5 | 5 | 5 |
| Acetone | 5 | 5 | 5 |
| Alkali resistance | 5 | 5 | 5 |
| Acid resistance | 5 | 5 | 5 |

EXAMPLE 11

To 375 parts of the white pigmented paste obtained in Example 3 was added 30 parts of an epoxy resin having a melting point of 64–74° C., an epoxy equivalent of 450–500, and a molecular weight of about 900 (which was a condensation product of bisphenol A with polyethylene glycol and was used in the form of a 50% butyl Cellosolve solution). After ground, the mixture was used to prepare an electrodeposition coating bath having a solids concentration of 13.2%, a pH of 8.66, and a specific electro-conductivity of $3.02 \times 10^2$ μ℧/cm. (at the time when the solids content was 11%). Using the thus prepared electrodeposition coating bath, an ferric phosphate-treated steel plate and a zinc phosphate-treated steel plate were subjected to electrodeposition coating at 80 v. for 3 minutes. Subsequently, the resulting films were baked at 180° C. for 30 minutes. The efficiencies of the films were as shown in Table 11.

TABLE 11

| Item | Substrate | |
|---|---|---|
| | Ferric phosphate-treated plate | Zinc phosphate-treated plate |
| Gloss value | 80.0 | 76.8 |
| Thickness ($\mu$) | 34 | 36 |
| Pencil hardness | F | F |
| Cross cut | 100/100 | 100/100 |
| Solvent resistance: | | |
| Xylene | 5 | 5 |
| Isopropanol | 5 | 5 |
| Acetone | 5 | 5 |
| Alkali resistance | 5 | 5 |
| Acid resistance | 5 | 5 |
| Salt spray test (mm.) | 4.5 | 1.5 |

As is clear from the salt spray results set forth in Table 2, it is understood that acrylic coating materials containing epoxy resins increase the corrosion resistance of the resulting films.

EXAMPLE 12

To 100 parts of the resinous solution obtained in Example 4 was added 10 parts of water-soluble melamine-resin. This mixed resinous solution was treated in the same manner as in Example 3 to obtain a white pigmented paste. This paste was used to prepare a coating bath having a solid concentration of 13 weight percent, a pH of 8.9, and a specific electroconductivity of $3.15 \times 10^2 \mu$ ʊ/cm. (at the time when the solid content was 11 weight percent).

Subsequently, electrodeposition coating and baking were effected under the same conditions as in Example 3. The efficiencies of the resulting films were as shown in Table 12.

TABLE 12

| Item | Substrate | | |
|---|---|---|---|
| | Colled rolled steel plate | Ferric phosphate-treated plate | Zinc phosphate-treated plate |
| Gloss value | 84.5 | 84.7 | 83.3 |
| Thickness ($\mu$) | 32 | 32 | 28 |
| Pencil hardness | H-2H | H-2H | H-2H |
| Cross cut | 100/100 | 100/100 | 100/100 |
| Solvent resistance: | | | |
| Xylene | 5 | 5 | 5 |
| Isopropanol | 5 | 5 | 5 |
| Acetone | 5 | 5 | 5 |
| Alkali resistance | 5 | 5 | 5 |
| Acid resistance | 5 | 5 | 5 |

EXAMPLE 13

Electrodeposition coating baths were prepared in the same manner as in Example 3, except that the amount of the 2-mercaptoethanol, which had been used as a molecular weight modifier, was varied as shown in Table 13. Using the thus prepared coating baths, colled rolled steel plates were subjected to electrodeposition coating at 80 v. for 3 minutes. Subsequently, the resulting films were baked at 180° C. for 30 minutes. The efficiencies of the films were as shown in Table 13.

TABLE 13

| | Amount of 2-mercaptoethanol added [1] | | |
|---|---|---|---|
| | 1.25% | 0.83% | 0.42% |
| pKa | 9.20 | 9.13 | 9.05 |
| n | 1.17 | 1.08 | 1.92 |
| $\alpha$ | 40 | 40 | 40 |
| Gloss: | | | |
| [I] | 81.7 | 79.1 | 63.2 |
| [II] | 68.9 | 75.3 | 49.5 |
| Molecular weight | 9,910 | 9,800 | 14,730 |

[1] Based on the monomer mixture.

In the table, Gloss [I] is the gloss value of the film formed by effecting the electrodeposition coating immediately after preparation of the bath, and Gloss [II] is the gloss value of the film obtained by effecting electrodeposition coating after continuously stirring the bath at 40° C. for 7 days after preparation.

From the results set forth in Table 13, it is understood that, depending on the difference in molecular weight, the polymers differ in pKa and $n$ values, though monomers constituting the polymers are same, and the stability of electrodeposition coating baths prepared therefrom and the gloss of the resulting films are greatly affected. It is also understood that particularly when a polymer high in molecular weight is used, no film excellent in gloss can be obtained because the resin is decreased in pKa value, is increased in $n$ value and is made inferior in bath stability, and the resulting film is degraded in heat reflowability.

EXAMPLE 14

Each 2 g. of the pigments set forth in Table 14 were individually dispersed in 100 g. of water. The dispersions were adjusted to the pH values as shown in Table 14. After 3 hours, the precipitated volumes of the pigments were measured, and the pKp values of the pigments were calculated by aforesaid relationship (page 23).

TABLE 14

| | Pigment | | |
|---|---|---|---|
| | TiO$_2$ (R-550) | Carbon Black (#100) | Red oxide |
| pH of dispersion: | | | |
| 2.0 | 98 | 10 | 95 |
| 3.0 | 98 | 10 | 95 |
| 4.0 | 98 | 10 | 95 |
| 5.0 | 10 | 10 | 95 |
| 6.0 | 10 | 10 | 15 |
| 7.0 | 10 | 10 | 15 |
| 8.0 | 10 | 97 | 15 |
| 9.0 | 95 | 97 | 15 |
| 10.0 | 96 | 97 | 95 |
| 11.0 | 98 | 97 | 97 |
| 12.0 | 98 | 97 | 97 |
| pKp | 8.6 | 7.8 | 9.6 |

Of the pigments shown in Table 14, TiO$_2$ (R-550) is a product of Ishihara Sangyo K.K., and Carbon Black is a product of Mitsubishi Kasei K.K.

The precipitated volume referred to in the above is the volume, represented by percent, of a pigment or enamel which has precipitated after dispersing it in water at a certain pH and allowing the dispersion to stand for a definite period of time. The greater the said value, the more favorable the water dispersibility.

Pigmented pastes were obtained by use of resins having pKa values of 8.33 and 9.06 and pigments having the pKp values shown in Table 15. These pastes were used to prepare coating baths. The thus prepared pgimented baths were measured in dispersion stability to obtain the results shown in Table 15.

TABLE 15

| pKa of— | | Precipitated volume after— | | pKa of— | | Precipitated volume |
|---|---|---|---|---|---|---|
| Resin | Pigment | 1.5 hours | 3 hours | Resin | Pigment | |
| 8.33 | 9.70 | 72.5 | 55.5 | 9.06 | 9.70 | 96 |
| 8.33 | 9.05 | 71.5 | 50.5 | 9.06 | 9.53 | 73 |
| 8.33 | 8.60 | 22.0 | 11.0 | 9.06 | 9.45 | 61 |
| 8.33 | 8.30 | 10.0 | 10.0 | 9.06 | 8.95 | 52 |
| 8.33 | 7.75 | 33.0 | 11.0 | 9.06 | 8.60 | 52 |
| 8.33 | 6.73 | 99.0 | 99.0 | 9.06 | 7.75 | 54 |
| | | | | 9.06 | 6.73 | 84 |

From the results shown in Table 15, it is clear that a coating bath obtained by combining a pigment and a resin which satisfy the condition $|pKp - pKa| \geq 0.1$ is excellent in water dispersibility of paint particles and is prominent in dispersion stability thereof, as well.

EXAMPLE 15

The resin having pKa of 9.20, which was obtained in Example 3, titanium oxide having pKp of 9.53, and carbon black having pKp of at least 10 were used to prepare colored coating baths in the following manner. Grey pigmented bath:

To 100 parts of the resin solution, 55 parts of $TiO_2$ and 1.5 parts of carbon black were added. The mixture was ground in a ball mill for 24 hours and was then charged with additional 200 parts of the resin solution to obtain a grey pigmented paste. This paste was used to prepare a coating bath having a concentration of 13% and a pH of 8.75. Black pigmented bath:

To 100 parts of the resin solution, 5.1 parts of the carbon black was added. The mixture was ground in a ball mill for 24 hours and was then charged with additional 200 parts of the resin solution to obtain a black pigmented paste. This paste was used to prepare a coating bath having a concentration of 11.8% and a pH of 8.8.

By use of the above-mentioned baths, colled rolled steel plates and zinc phosphate-treated plates were electrodeposition-coated at 8 v. for 2 minutes, and the resulting films were baked at 180° C. for 30 minutes. The efficiencies of the films were as shown in Table 16.

TABLE 16

| | Colored enamel | | | |
|---|---|---|---|---|
| | Grey | | Black | |
| Substrate | Colled rolled steel plate | Zinc phosphate-treated plate | Colled rolled steel plate | Zinc phosphate-treated plate |
| Item: | | | | |
| Gloss value | 75.1 | 71.8 | 87.2 | 86.6 |
| Thickness ($\mu$) | 36 | 32 | 49 | 36 |
| Pencil hardness | HB | HB | 3B | 2B |
| Cross cut | 100/100 | 100/100 | 100/100 | 100/100 |
| Solvent resistance: | | | | |
| Xylene | 4-5 | 4-5 | 5 | 4-5 |
| Isopropanol | 5 | 4-5 | 4-5 | 4-5 |
| Acetone | 5 | 5 | 4-5 | 4-5 |
| Alkali resistance | 5 | 5 | 5 | 5 |
| Acid resistance | 5 | 5 | 5 | 5 |

From the results set forth in Table 16, it is obvious that even formed into colored coatings, the coating compositions of the present invention give excellent films by one-coat finish.

The stabilities of the above coating baths are shown in Table 17 with reference to the gloss values of the films.

TABLE 17

| | Colored enamel | | | |
|---|---|---|---|---|
| | Grey | | Black | |
| Substrate | Colled rolled steel plate | Zinc phosphate-treated plate | Colled rolled steel plate | Zinc phosphate-treated plate |
| Elapsed days: | | | | |
| 0 | 75.1 | 71.8 | 87.2 | 86.6 |
| 10 | 76.1 | 73.1 | 91.1 | 83.5 |
| 22 | 76.5 | 71.0 | 88.4 | 83.6 |

From the results set forth in Table 17, it is evident that the colored enamel coating baths in accordance with the present invention are markedly excellent in stability and always give uniform films.

Referential Example 1

A mixture comprising the compounds shown below was polymerized in the same manner as in Example 2 to obtain a resin solution.

| | Parts |
|---|---|
| Ethyl acrylate | 155 |
| 2-ethylhexyl acrylate | 157 |
| Styrene | 146 |
| N-butoxymethyl acrylamide | 118 |
| Acrylic acid | 22 |
| Azobisisobutyronitrile | 22.4 |
| 2-mercaptoethanol | 6 |
| Isopropanol | 474 |

The resin solution was neutralized with 16 parts of β-dimethylaminoethanol to form a resin having pKa of 8.57, $n$ of 1.10, $\alpha$ of 60%, and Tg of −3.0° C. The resin solution had a solids content of 54.0%, an acid number of 11.8, and a viscosity of T (Gardner). From the said resin solution, a white pigmented paste was obtained in the same manner as in Example 3. This enamel paste was used to prepare an electrodeposition coating bath having a solids concentration of 13%, a pH of 8.4 and a specific electroconductivity of $4.85 \times 10^2$ $\mu\mho$/cm. (at the time when the solids content was 11%). Subsequently, electroreposition coating was effected under the same conditions as in Example 3, and the resulting films were baked at 180° C. for 30 minutes. The efficiencies of the thus formed films were as shown in Table 18.

TABLE 18

| | Substrate | | |
|---|---|---|---|
| Item | Colled rolled steel plate | Ferric phosphate-treated plate | Zinc phosphate-treated plate |
| Gloss value | 78.0 | 77.6 | 67.3 |
| Thickness ($\mu$) | 28 | 27 | 27 |
| Pencil hardness | H | H | H |
| Cross cut | 100/100 | 100/100 | 100/100 |
| Solvent resistance: | | | |
| Xylene | 3 | 4 | 3 |
| Isopropanol | 4 | 5 | 5 |
| Acetone | 4-5 | 5 | 4 |
| Alkali resistance | | 5 | 4 |
| Acid resistance | 5 | 4 | 4 |
| Bath stability test: | | | |
| Gloss value at the 2nd day | 18.7 | 13.2 | 43.1 |
| Gloss value at the 7th day | 14.3 | 7.0 | 32.0 |

In the table, other items than the bath stability test are the same as in the case of Example 3. The bath stability test is represented by the gloss value of a film formed by subjecting the bath to continuous stirring in open at 25° C. and electrodeposition-coating the film during said stirring. From the results set forth in Table 18, it is clear that when acrylic acid is used, the resulting resin is favorable in pKa and $n$ values, but a coating bath made by use of said resin is marked in degradation in stability due to elapse of time. This indicates the fact that then a polymer obtained by use of acrylic acid as the acid component is the mixture of polymers having a various pKa value, so that polymers low in pKa value have gradually migrated into the aqueous phase.

Referential Example 2

An electrodeposition coating material was prepared by use of a polymer obtained in such a manner that an amide polymer was former by use of acrylic acid as an α,β-ethylenically unsaturated fatty acid and then the amide group was N-butoxymethylated with formaldehyde and butanol. The results of examination in efficiencies of the electrodeposition coating material are shown in Table 18.

One half of a mixture comprising the compounds shown below was charged into the same device as in Example 2, and polymerization was initiated at the boiling point of the mixture. The remaining mixture was added dropwise in 3 hours and was polymerized.

| | Parts |
|---|---|
| Acrylic acid | 64 |
| Acrylamide | 120 |
| Styrene | 200 |
| Ethyl acrylate | 216 |
| Butyl acrylate | 200 |
| Butanol | 560 |
| Di-, tert-butyl peroxide | 8 |
| Tert-dodecyl mercaptan | 40 |

To the resulting polymer solution, 121.5 parts of paraformaldehyde was added, and the mixture was dehydrated, with reflux, until water had been completely removed. The amount of water removed was 59.4 ml.

The thus obtained resin solution was charged with $TiO_2$ and was treated in the same manner as in Example 3 to prepare an electrodeposition coating bath having a solids concentration of about 10%, a pH of 8.58, a specific electroconductivity of $6.17 \times 10^2 \mho\mu$/cm., pKa of 8.53, $n$ of 0.74 and $\alpha$ of 40%.

The resin of the present invention, formed by using itaconic acid as the acid component (the resin obtained in Example 3), had pKa of 9.20 and $n$ of 1.17, and gave a coating bath having a specific electroconductivity of $2.24 \times 10^2 \mu\mho$/cm. In view of the above, it is anticipated that the bath stability of a coating bath, which has been prepared by use of a polymer obtained by using acrylic acid as the acid component, would be such that the resulting films are inferior in efficiencies. This in considered ascribable to the fact that acrylic acid, when used as the acid component, is low in copolymerizability with other monomers and gives the mixture of polymers having various different pKa and $n$ values, so that polymers low in pKa value elute into the aqueous medium to degrade the stability of the coating bath.

Using the thus prepared coating bath, a colled rolled steel plate (abbreviated as Fe), a zinc phosphate-treated plate (abbreviated as P-Zn), and a ferric phosphate-treated plate (abbreviated as P-Fe) were individually subjected to (A) coating at 60 v. for 3 minutes and curing at 160° C. for 30 minutes, (B) coating at 80 v. for 3 minutes and curing at 180° C. for 30 minutes, and (C) coating at 100 v. for 3 minutes and curing at 180° C. for 30 minutes. The efficiencies of the resulting films were as shown in Table 19.

TABLE 19

| | Coating and curing conditions | | | | | | | | |
|---|---|---|---|---|---|---|---|---|---|
| | (A) | | | (B) | | | (C) | | |
| Substrate | Fe | P-Fe | P-Zn | Fe | P-Fe | P-Zn | Fe | P-Fe | P-Zn |
| Item: | | | | | | | | | |
| Gloss value | 67.7 | 70.7 | 60.9 | 50.5 | 55.5 | 55.0 | 36.9 | 49.4 | 49.7 |
| Thickness ($\mu$) | 37 | 34 | 33 | 44.5 | 45 | 36 | 65 | 53.5 | 45 |
| Pencil hardness | 2H | 2H | 2H | | | | 2H | 2H | 2H |
| Cross cut | 100/100 | 100/100 | 100/100 | | | | 100/100 | 100/100 | 100/100 |
| Solvent resistance: | | | | | | | | | |
| Xylene | 4-5 | 4-5 | 5 | | | | 4-5 | 4-5 | 4-5 |
| Isopropanol | 4-5 | 4-5 | 4-5 | | | | 4-5 | 4-5 | 4-5 |
| Acetone | 5 | 5 | 4-5 | | | | 4 | 4 | 4 |
| Alkali resistance | 2 | 2 | 2 | | | | 2 | 2 | 2 |
| Acid resistance | 4 | 4 | 4 | | | | 5-4 | 4 | 5-4 |
| Erichsen value | | | | 15 | 6 | 7 | | | |
| Impact resistance | | | | 20 | 20 | 30 | | | |

From the results set forth in Table 19, it is evident that films formed by use of the coating material of this referential example are not so excellent in gloss and are also low in Erichsen value and impact resistance as compared with films formed by use of the present coating compositions.

Further, the stability of the above coating bath is shown in Table 20 with reference to the gloss values of films formed by effecting the coating at 60 v. for 3 minutes and the curing at 180° C. for 30 minutes.

TABLE 20

| | Substrate | | | | |
|---|---|---|---|---|---|
| Elapsed days | Colled rolled steel plate | Ferric phosphate-treated plate | Zinc phosphate-treated plate | pH | Specific electroconductivity ($\mu\mho$/cm.$^2$) |
| 0 | 67.7 | 70.7 | 60.9 | 8.58 | $6.17 \times 10$ |
| 1 | 17.9 | 21.6 | 19.3 | 8.80 | $6.630 \times 10$ |
| 3 | 21.0 | 28.0 | 22.0 | 8.62 | $7.695 \times 10$ |

From the results set forth in Table 20, it is understood that a coating material obtained by use of acrylic acid as the acid component is markedly low in bath stability, and is not usable as an electrodeposition coating material, which is suitable for one-coat finish and which has practical efficiencies.

Referential Example 3

A mixture comprising the compounds shown below was treated in the same manner as in Example 3 to obtain a resin solution.

| | Parts |
|---|---|
| Acrylamide | 25 |
| Methacrylic acid | 25 |
| Butyl acrylate | 125 |
| Styrene | 75 |
| Butanol | 270 |
| Di-tert-butyl peroxide | 3.8 |
| Tert-dodecyl mercaptan | 2.5 |

450 parts of the resin solution was charged with 22.5 parts of paraformaldehyde and 2.25 parts of triethylamine, and was refluxed to introduce N-methylol group into the amide copolymer. The resin solution is then treated in the same manner as in Example 3 to obtain a pigmented paste. This paste was used to prepare an electrodeposition coating bath having pKa of 8.61, $n$ of 0.42, $\alpha$ of 40%, a pH of 9.1, and a specific electroconductivity of $7.43 \times 10^2 \mu\mho$/cm. Using the thus prepared bath, a colled rolled steel plate, a zinc phosphate-treated plate, and a ferric phosphate-treated plate were individually electrodeposition-coated at 66 v. for 3 minutes, and the resulting films were baked at 175° C. for 30 minutes. The efficiencies of the films thus formed were shown in Table 21.

TABLE 21

| | Substrate | | |
|---|---|---|---|
| Item | Colled rolled steel plate | Ferric phosphate-treated plate | Zinc phosphate-treated plate |
| Gloss value | 1.0 | 1.4 | 1.0 |
| Thickness ($\mu$) | 60 | 60 | 50 |
| Pencil hardness | H | F | H |
| Cross cut | 20/100 | 100/100 | 100/100 |
| Solvent resistance: | | | |
| Xylene | 5 | 2 | 3 |
| Isopropanol | 5 | 2 | 4-5 |
| Acetone | 3 | 1 | 1 |
| Alkali resistance | 3 | 3 | 3 |
| Acid resistance | 3 | 3 | 3 |

From the results set forth in Table 21, it is evident that the electrodeposition coating material of this referential example has no practical efficiencies, and is not suitable as a coating material for one-coat finish.

Referential Example 4

A mixture comprising the compounds shown below was treated in the same manner as in Example 3 to prepare an electrodeposition coating bath having pKa of 6.84, $n$ of 2.21, $\alpha$ of 40%, a pH of 6.52, and a specific electroconductivity of $1.28 \times 10^3 \mu\mho$/cm.

|                      | Parts |
|----------------------|-------|
| Ethyl acrylate       | 425   |
| Acryl amide          | 25    |
| Itaconic acid        | 50    |
| Azobisisobutylonitrile | 22.4 |
| 2-mercapto ethanol   | 6     |
| Isopropanol          | 472   |

Using the thus prepared bath, a coiled rolled steel plate, a zinc phosphate-treated plate, and a ferric phosphate-treated plate were individually electrodeposition-coated to form films having, respectively, gloss values of 86.5, 28.0 and 83.5 and thicknesses of 47, 34.5 and 47. However, no film having practical efficiencies could be obtained at all, since the resin in the bath was a thermoplastic resin.

Referential Example 5

Mixtures D-1 and D-2 comprising, respectively, the compounds shown below were treated in the same manner as in Example 3 to obtain resin solutions.

D-1:
| | Parts |
|---|---|
| Ethyl acrylate | 250 |
| Styrene | 143 |
| N-butoxymethyl acrylamide | 286 |
| Itaconic acid | 29.3 |
| Isopropanol | 269 |
| Azobisisobutyronitrile | 22.4 |
| 2-mercaptoethanol | 6.0 |

D-2:
| | |
|---|---|
| Ethyl acrylate | 693 |
| Styrene | 426 |
| N-butoxymethyl acrylamide-itaconic acid mixture in Example 1(A) | 486 |
| Isopropanol | 800 |
| Azobisisobutyronitrile | 56 |
| 2-mercaptoethanol | 15 |

The resin solutions were used to prepare electrodeposition coating baths in the same manner as in Example 3. Physical constants of the resins and the coating baths were as shown in Table 22.

TABLE 22

|  | Resin | |
|---|---|---|
|  | D-1 | D-2 |
| pKa | 7.75 | 9.06 |
| n | 1.67 | 0.82 |
| α, percent | 35 | 40 |
| Acid number | 72.5 | 19.0 |
| Electrochemical equivalent | 1,260 | 6,750 |
| Specific electroconductivity of bath, μʊ/cm | 9.34×10² | 1.96×10² |
| pH of bath | 7.39 | 8.80 |
| Tg, °C | 22 | 15 |

Using the said coating baths, coiled rolled steel plates, ferric phosphate-treated plates, and zinc phosphate-treated plates were individually electrodeposition-coated to form films. The efficiencies of the films were as shown in Table 23.

In this referential example, the resin D-1, in which the copolymerization proportion of acid had been made large to increase the acid number of the polymer, and the resin D-2 of the present invention, in which the copolymerization proportion of acid had been made small, were used to examine the characteristics of the resins and the effects of said resins on films obtained by electrodeposition coating. As is clear from Tables 22 and 23, the increase in acid number of the resin results in the decrease in pKa value and the increase in n value of the resin, and results in the increase in specific electroconductivity of the coating bath made therefrom, with the result that the film obtained by electrodeposition coating is increased in thickness and is degraded in smoothness and gloss. It is thus evident that the increase in acid number of the resin employed makes it impossible to obtain an electrodeposition coating material suitable for one-coat finish.

We claim:

1. An aqueous coating composition for electrodeposition coating consisting essentially of in water a water-soluble or water-dispersible copolymer resin comprising 93.5 to 35 mole percent of component (A), which is a monomer mixture of at least one compound represented by the general formula:

$$CH_2=C-COO-R_4$$
$$\phantom{CH_2=C-}|$$
$$\phantom{CH_2=}R \qquad (I)$$

wherein R is a hydrogen atom or a methyl group, and $R_4$ is a branched or straight chain alkyl group having 1–18 carbon atoms, with at least one other monomer which is styrene, α-alkyl styrene, acrylonitrile or a hydroxyalkyl acrylate or methacrylate of the formula:

$$CH_2=C-COOR_2OH$$
$$\phantom{CH_2=C-}|$$
$$\phantom{CH_2=}R$$

wherein R is hydrogen or methyl and $R_2$ is alkylene of 1–8 carbon atoms, wherein the component (A) is selected so that the molar ratio of the monomer represented by the general Formula I to said other monomer is 99.9/0.1 to 40/60, 1.5–15 mole percent of a component (B), which is a compound represented by the general formula:

$$CH_2=C-COOH$$
$$\phantom{CH_2=C-}|$$
$$\phantom{CH_2=}(CH_2)_mCOOH \qquad (II)$$

wherein $m$ is 1 or 2, and 5–50 mole percent of a compound (C), which is at least one compound represented by the general formula:

$$CH_2=C-CO-N\genfrac{}{}{0pt}{}{H}{R_2OR_3} \qquad (III)$$
$$\phantom{CH_2=C-}|$$
$$\phantom{CH_2=}R$$

wherein R is an defined above, $R_2$ is a branched or straight chain alkylene group having 1–8 carbon atoms, and $R_3$ is a branched, cyclic or straight chain alkyl group having 1–6 carbon atoms, and wherein the sum of the above components (A), (B), and (C) is selected so

TABLE 23

| | Resin | | | | | |
|---|---|---|---|---|---|---|
| | D-1 | | | D-2 | | |
| Substrate | Coiled rolled steel plate | Zinc phosphate-treated plate | Ferric phosphate-treated plate | Coiled rolled steel plate | Zinc phosphate-treated plate | Ferric phosphate-treated plate |
| Item: | | | | | | |
| Gloss value | 48.2 | 10.3 | 13.2 | 92.8 | 91.3 | 90.8 |
| Thickness (μ) | 75 | 30 | 71 | 36 | 35 | 38 |
| Pencil hardness | F | F | F | H | H | H |
| Cross cut | 100/100 | 100/100 | 100/100 | 100/100 | 100/100 | 100/100 |
| Solvent resistance: | | | | | | |
| Xylene | 3 | 3 | 3 | 3 | 3 | 3 |
| Isopropanol | 4 | 4 | 4 | 4 | 3 | 4 |
| Acetone | 2 | 2 | 2 | 4-59 | 4 | 5 |
| Alkali resistance | 4 | 4 | 4 | 5 | 5 | 5 |
| Acid resistance | 5 | 5 | 5 | 5 | 4 | 4 |
| Film surface | Coarse | Coarse | Coarse | Smooth | Smooth | Smooth | as to be equal to 100 mole percent and characterized in that the resin after neutralization has the following properties:
(1) in the equation defined by pH=pKa+$n$ log ($\alpha/1-\alpha$) (IV) wherein pH represents pH value in aqueous resinous solution or dispersion, pKa is a parameter which represents the acidity of the resin component, $\alpha$ represents the neutralization degree of the resin component, $8.0 \leq pKa$, $0.5 \leq n \leq 1.5$ and $30\% \leq \alpha \leq 80\%$, and $n$ is a parameter showing the extension of the resin in water,
(2) the resin has a glass transition temperature Tg of 60° C. or below, and
(3) the resin has an average molecular weight of 5,000 to 20,000.

2. A coating composition according to claim 1, wherein the characteristics of the resin after neutralization are such that the resin satisfies, in the Equation IV, the conditions of $8.5 \leq pKa \leq 9.5$, $0.8 \leq n \leq 1.3$, and $30\% \leq \alpha \leq 80\%$, has a glass transition temperature Tg of 30° C. or below, and has an average molecular weight of 5,000 to 15,000.

3. A coating composition according to claim 2, which contains a pigment satisfying a relationship represented by the equation:

$$|pKp-pKa| \geq 0.1$$

wherein pKa is as defined above, and pKp represents the acidity of the pigment.

4. A coating composition according to claim 3 which comprises 60 parts by weight or less of N-alkoxymethylmelamine and/or epoxy resins and 100 parts by weight of the resin components comprising 93.5–35 mole percent of the component (A), 1.5–15 mole percent of the component (B), and 5–50 mole percent of the component (C).

5. A coating composition according to claim 3, wherein the coating composition is so prepared as to form an aqueous electrodeposition coating bath containing 2–20% by weight of the water-soluble or water-dispersible resin as a main component and having a specific electroconductivity at 25° C. of 150–800 $\mu\mho$/cm., at the time when the solids content of the bath is 11% by weight.

6. A coating composition according to claim 5, wherein the water-soluble or water-dispersible resin has been prepared by use of a water-miscible organic solvent as a polymerization medium.

7. A coating composition according to claim 6, wherein the water-soluble or water-dispersible resin employed contains 10–30 mole percent of the component (C).

8. A coating composition according to claim 7, wherein the component (C) comprising the compound represented by the general Formula III is N-butoxymethyl acrylamide or N-butoxymethyl methacrylamide.

9. A coating composition according to claim 3, which comprises an epoxy resin and/or an N-alkoxymethylated melamine resin containing an alkyl group having 1–4 carbon atoms, and a resin component comprising, as the component (A), a monomer mixture formed by mixing in a molar ratio of 99.9/0.1–40/60 at least one compound represented by the general Formula I with said other monomer; as the component (B), itaconic acid or $\alpha$-methyleneglutaric acid; and as the component (C), N-butoxymethyl acrylamide or N-butoxymethylmethacrylamide.

10. A coating composition according to claim 9 wherein the water-soluble or water-dispersible resin has been prepared by use of the monomer mixture containing an N-alkoxyalkyl acrylamide or methacrylamide obtained by mixing, in a molar ratio of 99.9/0.1–20/80, a compound represented by the general formula:

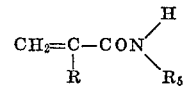

wherein R is a hydrogen atom or a methyl group, and $R_5$ is a hydrogen atom or an alkyl group having 1 to 12 carbon atoms, with itaconic acid or $\alpha$-methylene glutaric acid or an anhydride thereof and subjecting the mixture to dehydration condensation with alcohol and aldehyde in the presence of (1) an organic solvent azeotropic with water, (2) acrylonitrile, or (3) a mixture of (1) and (2).

11. A coating composition according to claim 9 wherein the water-soluble or water-dispersible resin has been prepared by use of the monomer mixture containing an N-alkoxyalkyl acrylamide or methacrylamide obtained by mixing, in a molar ratio of 99.9/0.1–20/80, a compound represented by the formula:

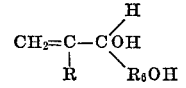

wherein R is a hydrogen atom or a methyl group, and $R_6$ is a branched or straight chain alkylene group having 1 to 3 carbon atoms, with itaconic acid or $\alpha$-methylene glutaric acid or an anhydride thereof, and subjecting the mixture to dehydration condensation with alcohol in the presence of (1) an organic solvent azeotropic with water, or (2) acrylonitrile, or (3) a mixture of (1) and (2).

12. A coating composition according to claim 11, wherein said aqueous bath containing the water-soluble or water-dispersible resin also includes, as a film formation-controlling agent, an amphoteric electrolyte having an isoelectric point of 5.5–8.5.

13. A coating composition according to claim 12, wherein the amphoteric electrolyte is an amino acid.

References Cited

UNITED STATES PATENTS

| | | | |
|---|---|---|---|
| 3,037,963 | 6/1962 | Christenson | 260—72 |
| 3,079,434 | 2/1963 | Christenson et al. | 260—72 |
| 3,163,623 | 12/1964 | Sekmakas et al. | 260—72 |

FOREIGN PATENTS

| | | | |
|---|---|---|---|
| 1,027,813 | 4/1966 | Great Britain | 260—29.4 |
| 1,030,425 | 5/1966 | Great Britain | 260—29.6 |

DONALD J. ARNOLD, Primary Examiner

H. MINTZ, Assistant Examiner

U.S. Cl. X.R.

117—132 B, 161 UT, 201; 260—29.6 NR, 29.6 TA, 29.6 HN, 78.5 R